(12) United States Patent
Lindström et al.

(10) Patent No.: US 12,062,500 B2
(45) Date of Patent: Aug. 13, 2024

(54) PHOTOVOLTAIC DEVICE

(71) Applicant: Exeger Operations AB, Stockholm (SE)

(72) Inventors: Henrik Lindström, Danderyd (SE); Giovanni Fili, Danderyd (SE)

(73) Assignee: EXEGER OPERATIONS AB, Stockholm (SE)

( * ) Notice: Subject to any disclaimer, the term of this patent is extended or adjusted under 35 U.S.C. 154(b) by 26 days.

(21) Appl. No.: 17/912,792

(22) PCT Filed: Mar. 17, 2021

(86) PCT No.: PCT/EP2021/056888
§ 371 (c)(1),
(2) Date: Sep. 19, 2022

(87) PCT Pub. No.: WO2021/209221
PCT Pub. Date: Oct. 21, 2021

(65) Prior Publication Data
US 2023/0215662 A1    Jul. 6, 2023

(30) Foreign Application Priority Data

Apr. 17, 2020  (EP) ..................................... 20170140

(51) Int. Cl.
*H01G 9/008* (2006.01)
*H01G 9/10* (2006.01)
*H01G 9/20* (2006.01)

(52) U.S. Cl.
CPC .............. *H01G 9/008* (2013.01); *H01G 9/10* (2013.01); *H01G 9/2022* (2013.01)

(58) Field of Classification Search
None
See application file for complete search history.

(56) References Cited

U.S. PATENT DOCUMENTS

| | | | |
|---|---|---|---|
| 2002/0132152 A1* | 9/2002 | Saito | H01M 8/0226 429/492 |
| 2007/0000775 A1* | 1/2007 | Nakahara | C25D 17/02 204/297.01 |

(Continued)

FOREIGN PATENT DOCUMENTS

| | | |
|---|---|---|
| CN | 102969167 A | 3/2013 |
| CN | 103730529 A | 4/2014 |

(Continued)

OTHER PUBLICATIONS

Machine translation of JP-2014017207 (Year: 2014).*

(Continued)

*Primary Examiner* — Tamir Ayad
(74) *Attorney, Agent, or Firm* — Tucker Ellis LLP

(57) ABSTRACT

The present invention relates to a photovoltaic device (1a) comprising a solar cell unit (2a) including a working electrode comprising a light-absorbing layer (3), a counter electrode including a porous conductive layer (6), and a conducting medium for transferring charges between the counter electrode and the working electrode, and a conductor (7) electrically connected to the porous conductive layer (6). The solar cell unit (2a) comprises at least one adhering layer (8) arranged between the conductor (7) and the porous conductive layer (6) for attaching the conductor to the porous conductive layer. The adhering layer (8) comprises an adhesive and conducting particles distributed in the adhesive so that a conducting network is formed in the adhesive.

17 Claims, 4 Drawing Sheets

(56) References Cited

U.S. PATENT DOCUMENTS

| | | | |
|---|---|---|---|
| 2007/0125420 A1* | 6/2007 | Ezure | H01G 9/2077 136/263 |
| 2010/0078060 A1 | 4/2010 | Okada | |
| 2010/0243050 A1 | 9/2010 | Goldstein | |
| 2013/0174906 A1 | 7/2013 | Lindstrom | |
| 2014/0216544 A1* | 8/2014 | Nakahara | C09J 11/04 252/514 |
| 2019/0244766 A1 | 8/2019 | Matsuo | |

FOREIGN PATENT DOCUMENTS

| | | | |
|---|---|---|---|
| CN | 107507880 A | | 12/2017 |
| EP | 2625703 B1 | | 8/2013 |
| EP | 3627527 A1 | | 3/2020 |
| JP | 2009147231 A | | 7/2009 |
| JP | 2014017207 A | * | 1/2014 |
| JP | 2015020851 A | | 2/2015 |
| JP | 2019201196 A | | 11/2019 |
| JP | 2020043199 A | | 3/2020 |
| WO | 2018025821 A1 | | 2/2018 |
| WO | 2019219538 A1 | | 11/2019 |
| WO | 2020015882 A1 | | 1/2020 |

OTHER PUBLICATIONS

International Search Report and Written Opinion from corresponding International Application No. PCT/EP2021/056888, mailed on Jun. 17, 2021, 13 pages.

Entegris, "Properties and Characteristics of Graphite", dated May 2013, 40 pages.

M. Zulkarnain et al., "Effects of Silver Microparticles and Nanoparticles on Thermal and Electrical Characteristics of Electrically Conductive Adhesives", Journal of Electronic Materials, vol. 46, No. 11, Aug. 3, 2017, 10 pages.

* cited by examiner

US 12,062,500 B2

PHOTOVOLTAIC DEVICE

TECHNICAL FIELD

The present invention relates to photovoltaic devices. More particular, the invention relates to photovoltaic devices comprising conductive layers and conductors attached to conductive layers.

BACKGROUND

Photovoltaic devices provide conversion of light into electricity. A typical photovoltaic device comprises one or more solar cells. Solar cells are well-known devices for converting solar radiation to electrical energy. A solar cell has a front side that faces the sun during normal operation to collect solar radiation and a back side opposite the front side.

EP2625703B1 discloses a dye-sensitized solar cell comprising a counter electrode including a porous conductive layer. The porous conductive layer is in contact with an electrolyte including ions for transferring electrons from a counter electrode to a working electrode. The electrolyte penetrates through the porous conductive layer. The electrolyte is very corrosive. Thus, the material of the porous conductive layer must be resistant to corrosion. The porous conductive layer may consist of titanium, nickel, molybdenum, tungsten, cobalt, niobium, zirconium and their alloys, or mixtures thereof.

WO2019/219538 discloses a photovoltaic device comprising a solar cell unit including a working electrode comprising a porous light-absorbing layer arranged at a top side of the solar cell unit, a porous upper conductive layer for extracting photo-generated electrons from the light-absorbing layer, wherein the light-absorbing layer is arranged on top of the upper conductive layer, a porous substrate made of an insulating material, wherein the porous upper conductive layer is formed on one side of the porous substrate, and a counter electrode including a porous lower conductive layer arranged at a bottom side of the solar cell unit, wherein the porous lower conductive layer is formed on an opposite side of the porous substrate. The photovoltaic device comprises a conducting medium for transferring charges between the counter electrode and the working electrode, such as a liquid electrolyte. The porous conductive layer may consist of titanium or an alloy thereof.

The photovoltaic device comprises an encapsulation encapsulating the solar cell unit to prevent the electrolyte from leaking from the solar cell. A problem with this photovoltaic device is how to conduct the generated electricity from the photovoltaic device, which is encapsulated together with a corrosive electrolyte, to the outside of the photovoltaic device. This problem is solved by applying conductors, made of material resistant to corrosion, such as of titanium or an alloy thereof, to the porous conductive layers. The conductors are arranged between the solar cell unit and the encapsulation. The encapsulation is provided with penetrations for accessing the power produced by the photovoltaic device. For example, wires from the outside of the encapsulation are going through the penetrations and electrically connect to the conductors. The penetrations are tightly fit around the wiring passing through the encapsulation such that liquid can pass through penetrations.

However, how to attach the conductor to the porous conductive layer so that good electrical contact is achieved between the conductor and the porous conductive layer is a problem. The efficiency of the solar cell unit is decreased with bad contact between the porous conductive layer and the conductor. It is important that the electrical resistance between the conductor and the porous conductive layer is low, to achieve high efficiency of the solar cell. Due to the high melting temperature of the materials resistant to corrosion, such as titanium, it is not possible to use welding or soldering for joining the conductor and the conductive layer. Another difficulty is the fact that the conductive layer is porous and have a rough surface with cavities, which makes it more complicated to achieve good electrical and mechanical contact between the conductor and the porous conductive layer. Further, the porosity of the conductive layer makes it fragile and sensitive to mechanical forces. Another difficulty is the high corrosivity and chemical reactivity of the electrolyte encapsulated in the solar cell unit. It is important that the solar cell unit is properly sealed to avoid leakage of the electrolyte to the surroundings.

SUMMARY

It is an aim of the present invention to at least partly overcome the above problem.

This aim is achieved by a photovoltaic device as defined in claim 1.

The photovoltaic device comprises a solar cell unit including a working electrode comprising a light-absorbing layer, a counter electrode including a porous conductive layer, a conducting medium for transferring charges between the counter electrode and the working electrode, and a conductor electrically connected to the porous conductive layer. The solar cell unit comprises at least one adhering layer arranged between the conductor and the porous conductive layer for attaching the conductor to the porous conductive layer, and the adhering layer comprises an adhesive and conducting particles distributed in the adhesive so that a conducting network is formed in the adhesive.

The conductor is in electrical contact with the conductive layer through the network of conducting particles in the at least one adhering layer. The adhesive makes it possible to adhere to the surface of the porous conductive layer. Further, applying the adhesive will not involve any mechanical forces on the porous conductive layer, and accordingly will not cause any damage of the surface of the porous conductive layer.

The temperature needed for melting the adhesive is low compared to the temperature needed for welding or soldering. The manufacturing of the solar cell unit is facilitated.

Preferably, the porous conductive layer is made of a corrosion resistant material, such as any of titanium, nickel, molybdenum, tungsten, cobalt, niobium, zirconium and their alloys, or mixtures thereof. Thus, the porous conductive layer can withstand contact with an electrolyte as the medium for transferring charges.

According to an embodiment, the photovoltaic device comprises an encapsulation enclosing the solar cell unit, the encapsulation is provided with a penetration hole comprising at least a part said adhering layer and the conductor is attached to the adhering layer and extends on the outside of the encapsulation. The adhering layer seals the penetration hole and prevents the conducting medium from leaking from the solar cell through the penetration hole. Due to the network of conducting particles in the adhering layer, the conductor doesn't need to be entered through the penetration hole to provide electrical contact with the porous conductive layer. Thus, the risk for leakage of the conducting medium is further reduced. The conductor is arranged on the outside of the encapsulation and has electrical contact with the porous conductive layer via the adhering layer. Consequentially, the conductor is not in contact with the conducting medium, and do not need to be made of a corrosion resistant material. Thus, the conductor can be made of any commonly use conducting material, such as copper or silver.

The adhering layer has three functions: to provide electrical connection between the conductor and the porous conductive layer, to attach the conductor to the porous conductive layer, to seal the penetration hole and prevent leakage of the conducting medium to the outside of the solar cell, and to prevent contact between the conductor and the conducting medium inside the solar cell unit.

According to an embodiment, the encapsulation comprises a gluing layer for attaching the encapsulation to the solar cell unit, and the gluing layer is made of the same material as the adhesive in the adhering layer. This is advantageous since the gluing layer of the encapsulation and the adhesive have the same demand on the ability to withstand the electrolyte. This will also facilitate manufacturing of the photovoltaic device since the adhesive and the gluing layer of encapsulation have the same melting temperature.

According to an embodiment, the solar cell unit comprises a non-porous conducting barrier disposed between the conductor and the porous conductive layer, and the at least one adhering layer comprises a first adhering layer disposed between the porous conductive layer and the conducting barrier for attaching the conducting barrier to the porous conductive layer, and a second adhering layer arranged between the conducting barrier and the conductor for attaching the conductor to the conducting barrier. If the conducting medium is an electrolyte including ions, the ions may travel through the adhering layer. To prevent this, a conducting barrier is arranged between the first and second adhering layer.

According to an embodiment, the encapsulation surrounds the first and second adhering layers and the conducting barrier. The encapsulation prevents the ions in the electrolyte to enter the second adhering layer and by that leak to the outside of the solar cell unit.

Preferably, the conducting barrier is solid flat piece made of a conducting material which can withstand the conducting medium of the solar cell.

According to an embodiment, the thickness of the conducting barrier is at least 10 nm.

According to an embodiment, the conducting barrier comprises of any of titanium, nickel, molybdenum, tungsten, cobalt, niobium, zirconium and their alloys, or mixtures thereof.

According to an embodiment, the conducting barrier is made of titanium or an alloy thereof. This will prevent corrosion of the conducting barrier since titanium can withstand the electrolyte.

According to an embodiment, the thickness of the adhering layer is at least 3 µm, preferably at least 5 µm, and most preferably at least 10 µm. This will ensure good mechanical contact between the adhering layer and the porous conductive layer.

According to an embodiment, the adhering layer comprises at most 40 vol-% of the conducting particles, wherein vol-% are percentage of a total volume of the adhering layer. This means that the adhering layer comprises at least 60 vol % of the adhesive. Thus, sufficient adhering ability of the adhering layer is achieved.

According to an embodiment, the adhering layer comprises at least 20 vol-% of the conducting particles. This will ensure good electrical conductivity of the adhering layer.

Preferably, the adhering layer comprises between 20 and 40 vol-% of the conducting particles.

According to an embodiment, at least 80 wt-% of the conducting particles have a size of 5 µm or less, wherein wt-% are percentage of a total weight of the conducting particles. Preferably at least 80 wt-% of the conducting particles have a size of 3 µm or less. This will provide good electrical contact with the porous conductive layer. Due to the fact that the conducting particles are small, they can fit in irregularities and cavities on the surface of the porous conductive layer so that good electrical contact is achieved between the conducting particles and the porous conductive layer.

According to an embodiment, the adhering layer comprises a mixture of conducting particles having a size less than 200 nm and conducting particles having a size larger than 1 µm. A mixture of larger and smaller particles will improve the conducting network formed in the adhesive since the small particles will fill in the space between the larger particles and will electrically connect the larger particles.

According to an embodiment, the mass ratio of the conducting particles larger than 1 µm and the conducting particles less than 200 nm is between 1.5 and 3. With the mass ratio is meant the mass of the large particles in the adhesive layer divided with the mass of the small particles in the adhesive layer. This will further improve the conducting network formed in the adhesive.

Preferably, the adhesive is made of a chemically resistant plastic material. If the conducting medium is an electrolyte, the adhesive must be made of a material able to withstand the electrolyte, and which do not react with the ions in the electrolyte. Most known plastic material will not resist contact with the electrolyte. Known adhesive plastic material, such as epoxy, will immediately react with the electrolyte and cannot be used.

According to an embodiment, the adhesive is polyethylene, or polypropylene, or ionomer or mixtures thereof. Those materials can withstand electrolytes used in solar cells.

According to an embodiment, the adhesive comprises polyethylene. Tests have shown that polyethylene has a good ability to adhere to non-corrosive material such as titanium and can withstand electrolytes used in solar cells, such as electrolytes containing $I^-$, $I_3^-$ ion pairs. Further, polyethene is a cheap material.

According to an embodiment, the gluing layer comprises polyethylene, or polypropylene, or ionomer or mixtures thereof.

According to an embodiment, the melting temperature of the adhesive and the gluing layer are substantially equal, or the melting temperature of the adhesive is lower than the melting temperature of the encapsulation. This makes it easier to manufacture of the photovoltaic device since the adhesive is melted during lamination of the encapsulation. Thus, no extra heating step is needed during manufacturing of the photovoltaic device.

According to an embodiment, adhesive comprises polyethylene and the gluing layer of the encapsulation comprises polyethylene. Tests have shown that polyethylene is a suitable material since it can withstand the electrolyte.

In one aspect, the conducting medium is an electrolyte. In one aspect, the conducting medium is an ion-based electrolyte. The electrolyte can be a liquid electrolyte, a gel or even solid.

In one aspect, the electrolyte is any of an iodide/triiodide electrolyte, a copper complex-based electrolyte, or a cobalt complex-based electrolyte, or a combination thereof.

According to an embodiment, the conducting particles comprises carbon. It is advantageous to use carbon in the conducting particles if the porous conductive layer is made of titanium, since carbon makes good electrical contact with titanium. Further, carbon is a cheap material.

In one aspect, the conducting particles are made of battery grade carbon. Ordinary carbon contains impurities, for example iron, which can be detrimental for the performance of the solar cell. Battery grade carbon is developed for carbon in batteries and fuel cells and has higher degree of purity than ordinary carbon and is therefore suitable to use in solar cells.

According to an embodiment, the conducting particles are made of battery grade graphite and battery grade carbon black. Battery grade graphite is larger carbon particle and battery grade carbon black is smaller carbon particle. Using a mixture of battery grade graphite and battery grade carbon black will achieve a good conducting network in the adhesive since the small particles will fill in the space between the larger particles and will electrically connect the larger particles.

According to an embodiment, the conducting particles are made of one or more in the group consisting of: crystalline graphite, amorphous carbon, carbon nanotubes, and graphene.

According to an embodiment, the conducting particles are made of a metal or a metal alloy comprising one or more of the following: titanium, nickel, molybdenum, cobalt, and niobium. The metal alloys may be a nitride, a hydride, a silicide, or a carbide of any of the metals, such as a titanium hydride, a boron nitride or a titanium silicide.

According to an embodiment, the conducting particles are made of titanium or an alloy thereof.

According to an embodiment, the porous conductive layer consists of any of titanium, nickel, molybdenum, tungsten, cobalt, niobium, zirconium and their alloys, or mixtures thereof.

According to an embodiment, the porous conductive layer comprises titanium or an alloy thereof. In one aspect, the porous conductive layer consists of titanium or an alloy thereof.

According to an embodiment, the solar cell unit comprises a porous substrate made of an insulating material, a upper conductive layer formed on one side of the porous substrate for extracting photo-generated electrons from the light-absorbing layer, and a second conductor in electrical contact with the second conductive layer, a part of the porous substrate comprises conducting material disposed between the second conductor and the upper conductive layer, and the photovoltaic device comprises at least one adhering layer comprising said adhesive including said conducting particles and disposed between the second conductor and said part of the porous substrate for attaching the second conductor to the porous substrate.

BRIEF DESCRIPTION OF THE DRAWINGS

The invention will now be explained more closely by the description of different embodiments of the invention and with reference to the appended figures.

DETAILED DESCRIPTION

Figure 1:
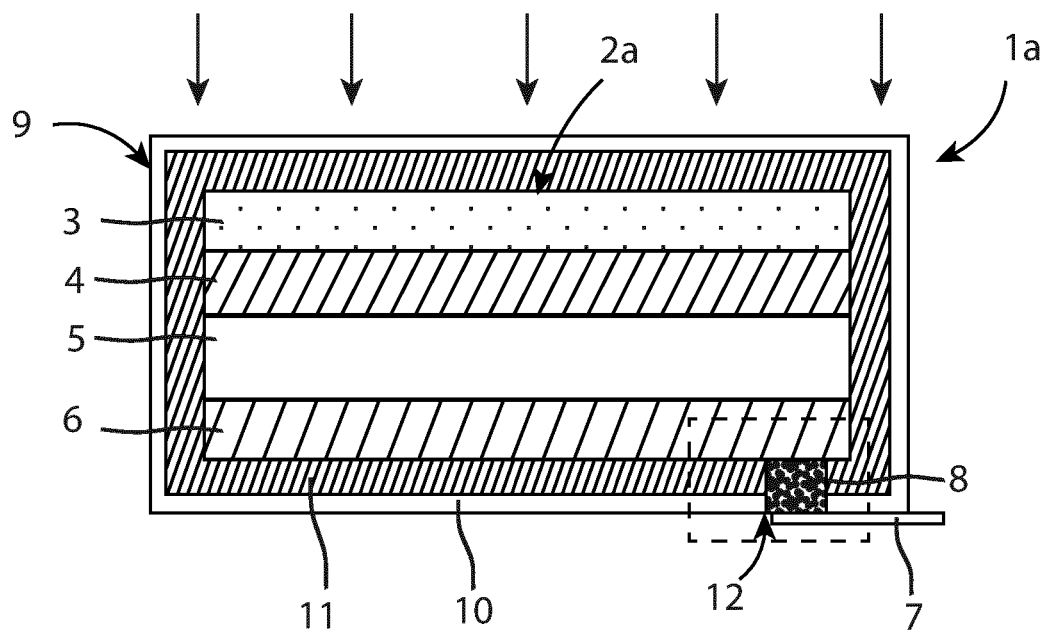
FIG. 1 shows a first example of a photovoltaic device according to the invention.

Aspects of the present disclosure will be described more fully hereinafter with reference to the accompanying drawings. The photovoltaic device can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Unless otherwise defined, all terms used herein have the same meaning as commonly understood by one of ordinary skill in the art to which this disclosure belongs.

FIG. 1 shows a first example of a photovoltaic device $1a$ according to the invention. The photovoltaic device $1a$ comprises a solar cell unit $2a$ including a working electrode comprising a light-absorbing layer 3, a counter electrode comprising a porous conductive layer 6, and a conducting medium (not shown) for transferring charges between the counter electrode and the working electrode. The solar cell unit $2a$ comprises a conductor 7, and an adhering layer 8 disposed between the conductor 7 and the porous conductive layer 6. The adhering layer 8 is in direct mechanical and electrical contact with the porous conductive layer 6. The adhering layer 8 adhere to the porous conductive layer 6. The conductor 7 is attached to the porous conductive layer 6 by means of the adhering layer 8. The adhering layer 8 acts as a glue between the conductor 7 and the porous conductive layer 6.

The conductor 7 is, for example, a wire or a conducting bar. The photovoltaic device $1a$ comprises an encapsulation 9 encapsulating the solar cell unit $2a$ including the conducting medium. The encapsulation 9 prevents the conducting medium from leaking from the solar cell unit. The conductor 7 is attached to the adhering layer 8 and extends on the outside of the encapsulation 9.

In one aspect, the light-absorbing layer 3 is porous and arranged at a top side of the solar cell unit $2a$. The light-absorbing layer 3 faces the sun and receives light. The solar cell unit $2a$ further comprises an upper porous conductive layer 4 for extracting photo-generated electrons from the light-absorbing layer 3. In this example, the light-absorbing layer 3 is arranged on top of the upper conductive layer 4. In this example, solar cell unit $2a$ comprises a porous substrate 5 made of an insulating material, and the upper conductive layer 4 is formed on one side of the porous substrate 5. The conductive layer 6, in the following named the lower conductive layer 6, is arranged at a bottom side of the solar cell unit. In this example, the lower conductive layer 6 is formed on an opposite side of the porous substrate 5. The conducting medium, for example an electrolyte, is infiltrated in the pores of the porous light absorbing layer 3, the upper and lower porous conductive layers, and the porous substrate 5. The conducting medium transfers charges between the lower conductive layer 6 and the light-absorbing layer 3. In one aspect, the conducting medium is an electrolyte. The conducting medium can be an ion-based electrolyte. For example, the electrolyte is any of an iodide/triiodide electrolyte, a copper complex-based electrolyte, or a cobalt complex-based electrolyte, or a combination thereof. Such electrolytes can be very corrosive.

Preferably, but not limited to, the upper and lower porous conductive layers are made of a corrosion resistant material, such as titanium, nickel, molybdenum, tungsten, cobalt, niobium, zirconium and their alloys, or mixtures thereof. Thus, the porous conductive layers can withstand contact with the electrolyte as the medium for transferring charges. Preferably, the upper and lower porous conductive layers comprise titanium or an alloy thereof.

Figure 2:
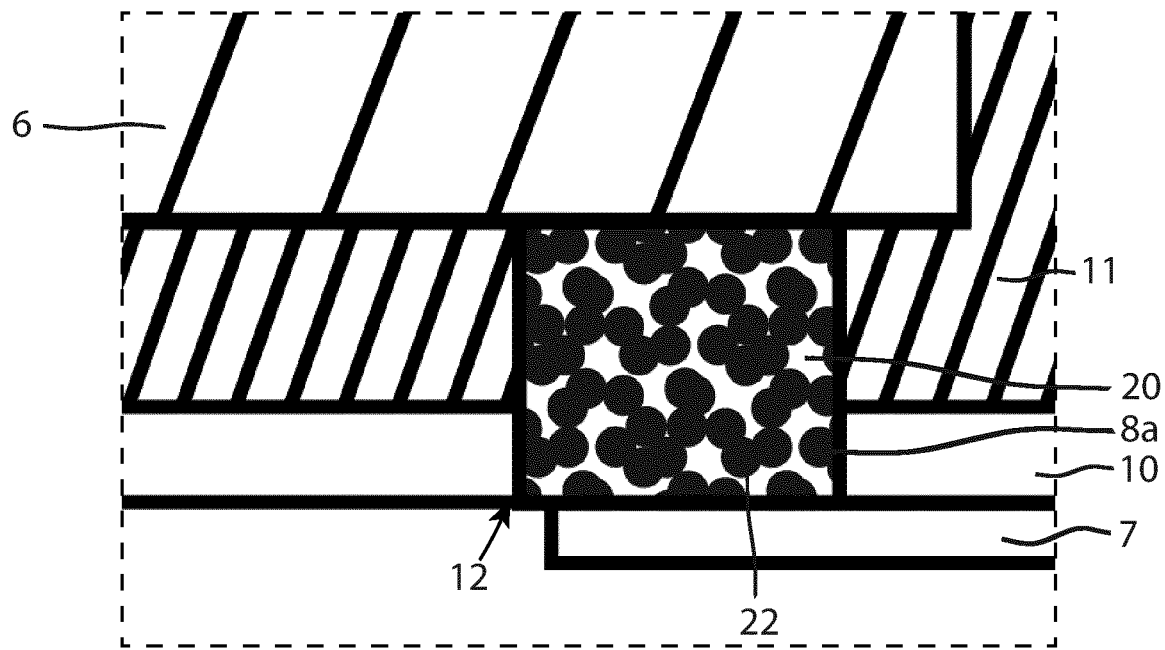
FIG. 2 shows a first example of an adhering layer disposed between a conductor and a porous conductive layer.
Figure 3:
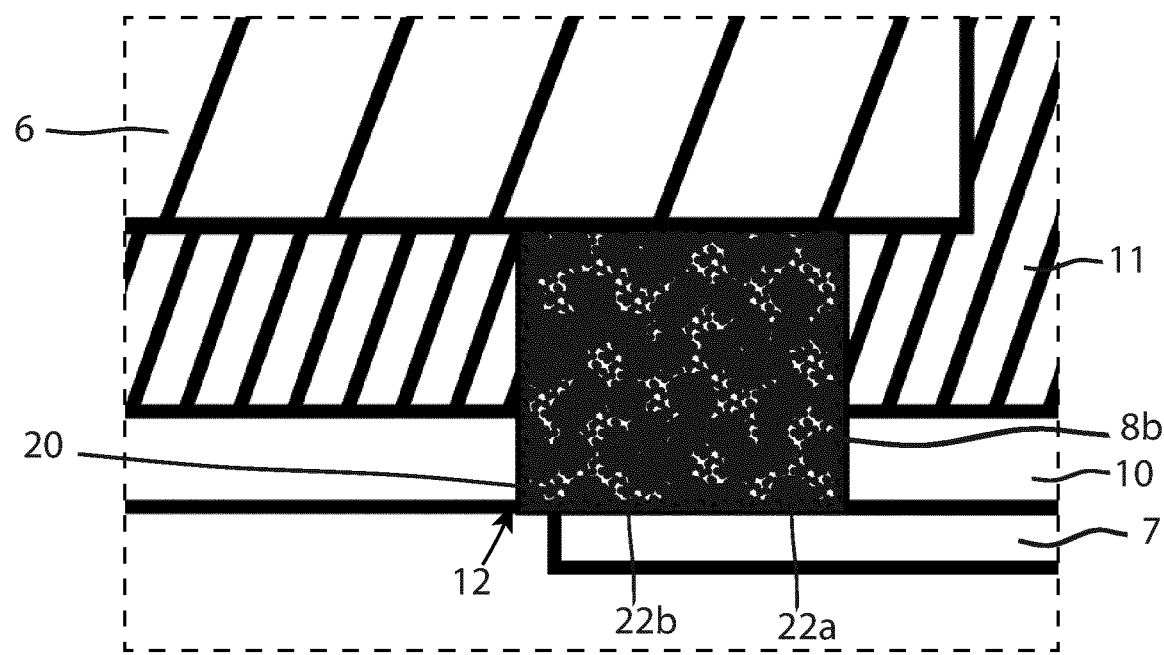
FIG. 3 shows a second example of an adhering layer disposed between the conductor and the porous conductive layer.

The adhering layer 8 comprises an adhesive and conducting particles distributed in the adhesive so that a conducting network is formed in the adhesive to achieve electrical contact between the conductor 7 and the lower porous conductive layer 6. FIGS. 2 and 3 show two examples of adhering layers 8a and 8b disposed between the conductor 7 and the lower porous conductive layer 6. The adhering layer 8 can be any of the adhering layers 8a and 8b. Each of the adhering layers 8a and 8b comprises an adhesive 20 and conducting particles 22, 22a-b distributed in the adhesive 20 so that a conducting network is formed in the adhesive. This means that the conducting particles are in electrical contact with each other so that they form an electrical path through the adhesive. The conducting particles are preferably well dispersed in the adhesive.

The thickness of the adhering layers 8, 8a-b is at least 3 µm, preferably at least 5 µm, and most preferably at least 10 µm to achieve sufficient mechanical contact between the conductor 7 and the lower porous conductive layer 6. Preferably, at least 80 wt-% of the conducting particles 22, 22a, 22b have a size of 5 µm or less, and most preferably the conducting particles 22, 22a, 22b have a size of 3 µm or less. With wt-% is meant percentages of a total weight of conducting particles in the adhering layer. This will provide good electrical contact with the porous conductive layer 6. Since the conducting particles are small, they can fit in irregularities and cavities on the surface of the porous conductive layer so that good electrical contact is achieved between the conducting particles and the porous conductive layer 6.

Preferably, but not limited to, the conducting particles 22, 22a-b are made of carbon. It is advantageous to use carbon in the conducting particles if the porous conductive layer 6 is made of titanium, since carbon makes good electrical contact with titanium. Preferably, the conducting particles are made of battery grade carbon. Ordinary carbon may contain impurities, which can be detrimental for the performance of the solar cell. Battery grade carbon is developed for carbon in batteries and fuel cells and has and has higher degree of purity than ordinary carbon and is therefore suitable to use in solar cells. The conducting particles 22, 22a-b are, for example, made of crystalline graphite, amorphous carbon, carbon nanotubes, or graphene.

If the conducting medium is an ion-based electrolyte, the adhesive 20 must be made of a material able to withstand the electrolyte, and which do not react with the ions in the electrolyte. Suitably, the adhesive 20 is made of a chemically resistant plastic material. For example, the adhesive is made of polyethylene, or polypropylene, or ionomer or mixtures thereof. Those materials are suitable since they can withstand electrolytes commonly used in solar cells. For example, the adhesive 20 is made of polyethylene. Tests have shown that polyethylene has a good ability to adhere to non-corrosive material such as titanium and can withstand electrolytes used in solar cells, such as electrolytes containing iodide rand/or triiodide $I_3^-$ ions.

The encapsulation 9 may comprise an at least partly transparent top sheet covering the top side of the solar cell unit 2a and a bottom sheet covering the bottom side of the solar cell unit. The encapsulation 9 may include several layers with different functions. The encapsulation 9 may comprise a barrier layer 10 preventing the conducting medium from leaking from the solar cell. The encapsulation 9 may further comprise a gluing layer 11 for attaching the encapsulation 9 to the solar cell. The gluing layer 11 is arranged between the barrier layer 10 and the solar cell 2a. The gluing layer 11 also act as a barrier preventing the conducting medium from leaking from the solar cell. If the conducting medium is a corrosive electrolyte, the gluing layer 11 of the encapsulation should be made of a material which can withstand the electrolyte. It is advantageous if the adhesive 20 and the encapsulation 9 are made of the same material since the encapsulation and the adhesive have the same demand on the ability to withstand the electrolyte. This will also facilitate manufacturing of the photovoltaic device, since the adhesive and the encapsulation have the same melting temperature. Suitably, the adhesive and the encapsulation are made of polyethylene. For example, the gluing layer 11 is made of polyethylene, or polypropylene, or ionomer or mixtures thereof. For example, the encapsulation 9 is made of polyethylene. Polyethylene is a suitable material since it can withstand the electrolyte and is transparent.

In one aspect, the encapsulation 9 comprise a penetration hole 12 arranged for connecting the photovoltaic device 1a to an external device and by that access the power produced by the photovoltaic device. The penetration hole 12 is through-hole in the encapsulation. The penetration hole comprises at least a part of the adhering layer 8 so that the penetration hole 12 is sealed and no gas or liquid can pass through the penetration hole. The adhering layer 8 fills the penetration hole 12 and accordingly seals the penetration hole and at prevents the conducting medium from leaking to the outside of the photovoltaic device through the penetration hole. Due to the network of conducting particles in the adhering layer 8, the conductor 7 doesn't need to be entered through the penetration hole 12 to provide electrical contact with the lower porous conductive layer 6. Thus, the risk for leakage of the conducting medium is further reduced. The conductor 7 is arranged on the outside of the encapsulation and has electrical contact with the with the porous conductive layer 6 via the adhering layer 8. Consequentially, the conductor 7 is not in contact with the conducting medium and do not need to be made of a corrosion resistant material. Thus, the conductor 7 can be made of any commonly used conducting material, such as copper or silver.

FIG. 2 show an example of an adhering layer 8a comprising the adhesive 20 and conducting particles 22 distributed in the adhesive. The adhering layer 8a is disposed between the conductor 7 and the lower porous conductive layer 6. In this example, the size of the conducting particles 22 is substantially the same.

FIG. 3 shows another example of an adhering layer 8b disposed between the conductor 7 and the lower porous conductive layer 6. In this example, the adhering layer 8b comprises a mixture of conducting particles 22a having a size larger than 1 µm and conducting particles 22b having a size less than 200 nm distributed in the adhesive 20. A mixture of larger and smaller particles will improve the conducting network formed in the adhesive 20 since the small particles will fill in the space between the larger particles and will electrically connect the larger particles to each other. Preferably, the mass ratio of the conducting particles 22a larger than 1 µm and the conducting particles 22b less than 200 nm is between 1.5 and 3. This will further improve the conducting network formed in the adhesive 20. With the mass ratio is meant the total mass $M_1$ of the large particles 22a divided with the total mass $M_2$ of the small particles 22b in the adhering layer.

$$1.5<M_1/M_2<3$$

Figure 4:
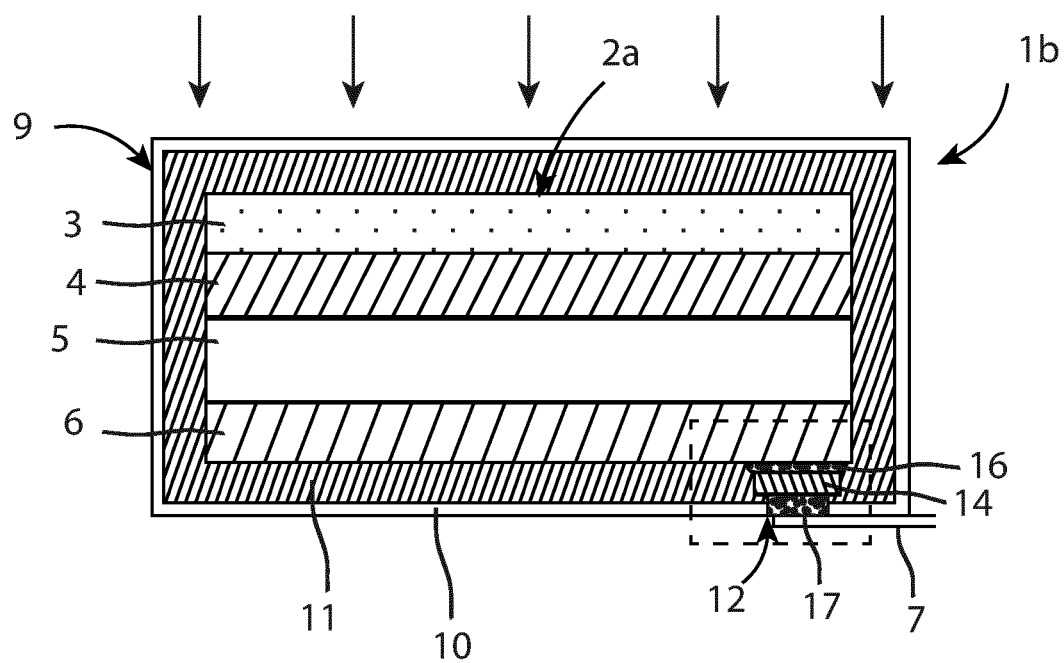
FIG. 4 shows a second example of a photovoltaic device according to the invention.
Figure 5:
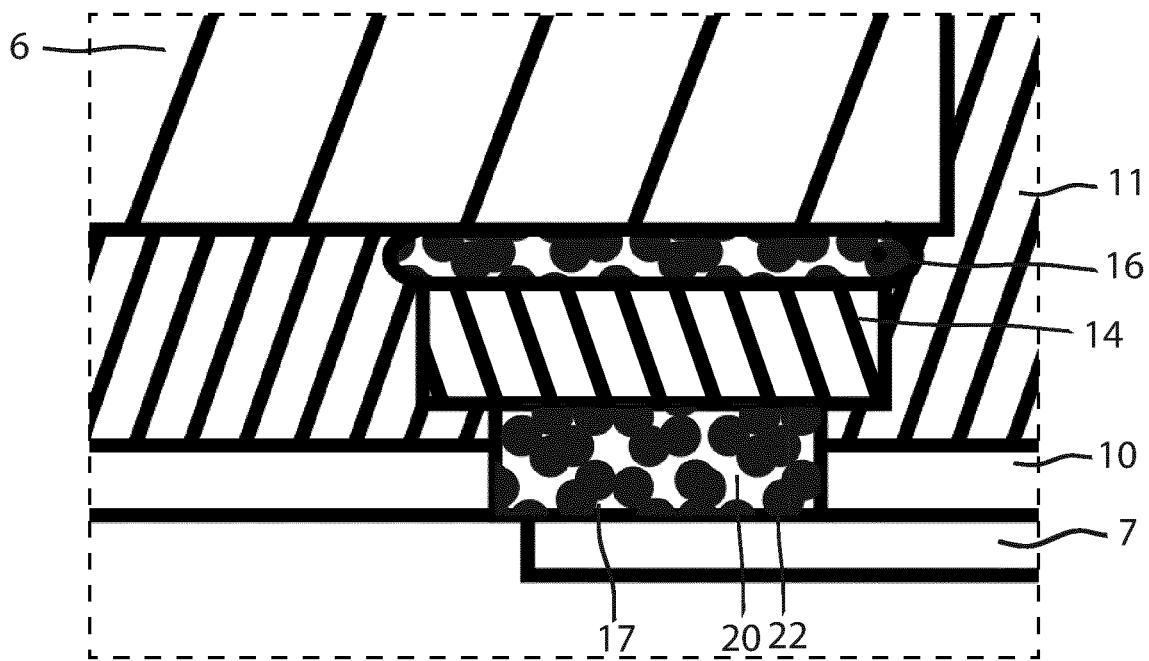
FIG. 5 shows a part of the photovoltaic device shown in FIG. 4 in an enlarged view.

FIG. 4 shows a second example of a photovoltaic device 1b according to the invention comprising a solar cell unit 2a. FIG. 5 shows a part of photovoltaic device 1b in an enlarged view. If the conducting medium is an electrolyte including ions, the ions may travel through the adhering layer since the conducting particles may reduce the sealing ability of the adhesive 20. To prevent this, a conducting barrier 14 is arranged between first and second adhering layers 16, 17. The solar cell unit 2b differs from the solar cell unit 2a since it comprises a non-porous conducting barrier 14 disposed between the conductor 7 and the lower porous conductive layer 6, and the at least one adhering layer comprises a first adhering layer 16 disposed between the lower porous conductive layer 6 and the conducting barrier 14 for attaching the conducting barrier 14 to the lower porous conductive layer 6, and a second adhering layer 17 arranged between the conducting barrier 14 and the conductor 7 for attaching the conductor 7 to the conducting barrier 14. Thus, the first adhering layer 16 act as a glue between the lower porous conductive layer 6 and the conducting barrier 14, and the second adhering layer 17 act as a glue between the conducting barrier 14 and the conductor 7. The first adhering layer 16 is in direct mechanical and electrical contact with the lower porous conductive layer 6. The conducting barrier 14 has two surfaces on opposite sides of the barrier 14. The first adhering layer 16 is also in direct mechanical and electrical contact with one of the surfaces of the conducting barrier 14 and second adhering layer 17 is in direct mechanical and electrical contact with the other surfaces of the conducting barrier 14. The conductor 7 is arranged on the outside of the encapsulation 9.

The second adhering layer 17 is arranged in the penetration hole 12 so that the penetration hole 12 is sealed and no gas or liquid can pass through the penetration hole.

The first and second adhering layers 16, 17 comprises conducting particles distributed in an adhesive 20 so that a conducting network is formed in the adhesive. Suitably, the first and second adhering layers 16, 17 are made of the same type of adhesive 20 and conducting particles 22, 22a-b as the adhering layer 8. The adhering layers 16, 17 can be of the same type as any of the adhering layers 8a and 8b. The conductor 7 has electrical contact with the lower porous conductive layer 6 via the first and second adhering layers 16, 17 and the conducting barrier 14.

Preferably, the conducting barrier 14 is solid piece made of a conducting material which can withstand the conducting medium of the solar cell. For example, the conducting barrier 14 comprises of any of titanium, nickel, molybdenum, tungsten, cobalt, niobium, zirconium and their alloys, or mixtures thereof. Preferably, the conducting barrier is made of titanium or an alloy thereof. This will prevent corrosion of the conducting barrier since titanium can withstand the electrolyte. For example, the conducting barrier 14 is made of the same material as the lower porous conductive layer 6.

To further improve the sealing ability, the width of the conducting barrier 14 is larger than the width of the second adhering layer 17, and the periphery of the second adhering layer 17 is disposed a distance from the periphery of the conducting barrier 14. This increases the path to be travelled by the ions between the first and second adhering layers 16, 17, as shown in FIG. 5. Preferably, the distance between the periphery of the second adhering layer 17 and the periphery of the conducting barrier 14 is more than 1 mm.

Suitably, the conducting barrier 14 is plate shaped. For example, the conducting barrier 14 has a circular shape, such as the shape of a coin. However, other shapes are also possible, such as rectangular. The thickness of the conducting barrier 14 is preferably at least 10 nm.

To further improve the sealing of the solar cell, the gluing layer 11 of the encapsulation 9 surrounds the first and second adhering layers 16, 17, and the conducting barrier 14. The gluing layer 11 prevents the ions in the electrolyte to enter the second adhering layer 17 and by that prevents the ions to leak to the outside of the solar cell unit.

FIG. 5 shows a part of the photovoltaic device shown in FIG. 4 in an enlarged view. In this example, the first and second adhering layers 16, 17 comprise conducting particles 22 distributed in an adhesive 20. In this example, the size of the conducting particles 22 is substantially the same.

Figure 6:
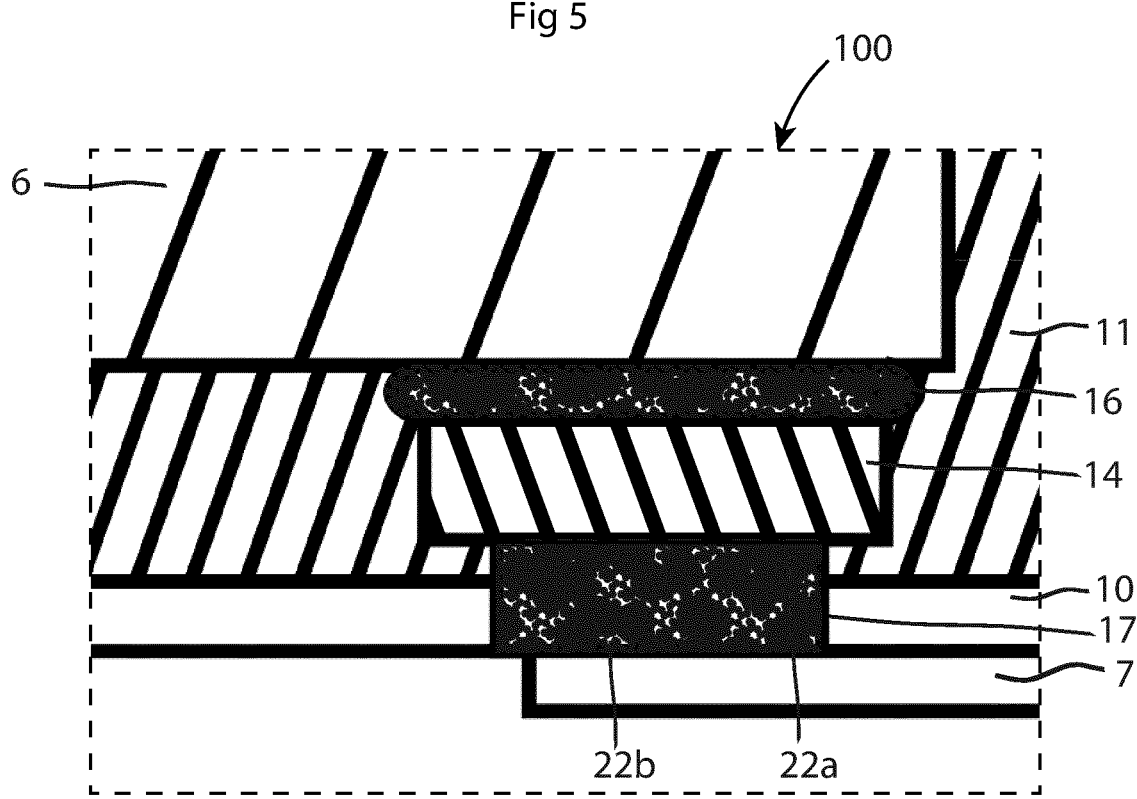
FIG. 6 shows a second example of adhering layers disposed between the conductor and the porous conductive layer in FIG. 4.

FIG. 6 shows another example of the first and second adhering layers 16, 17 shown in FIG. 4, in an enlarged view. In this example, the adhering layers 16, 17 comprises a mixture of conducting particles 22a having a size larger than 1 µm and conducting particles 22b having a size less than 200 nm distributed in the adhesive 20.

Figure 7:
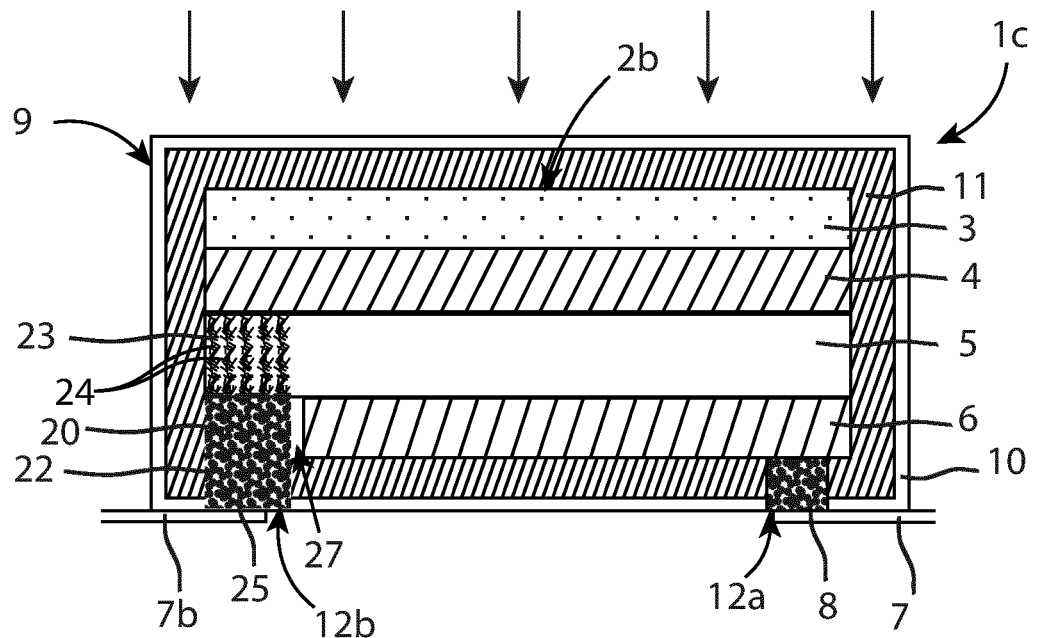
FIG. 7 shows a third example of a photovoltaic device according to the invention.

FIG. 7 shows a third example of a photovoltaic device 1c according to the invention. The solar cell unit 1c differs from the photovoltaic device 1a and 1b in that the solar cell unit 1c comprises a second conductor 7b in electrical contact with the upper conductive layer 4, and a conducting part 23 of the porous substrate 5 comprises conducting material 24. Further, the photovoltaic device 1c comprises an adhering layer 25 disposed between the second conductor 7b and the conducting part 23 of the porous substrate 5 for attaching the second conductor 7b to the porous substrate 5 and to provide electrical contact between the upper conductive layer 4 and the second conductor 7b. The conducting part 23 is disposed between adhering layer 25 and the upper conductive layer 4. The adhering layer 25 is in mechanical and electrical contact with the conducting part 23.

The second conductor 7b is arranged on the outside of the encapsulation 9 and has electrical contact with the upper porous conductive layer 4 via the adhering layer 25 and the conducting material 24 in the porous substrate 5. Consequentially, the conductor 7b is not in contact with the conducting medium and do not need to be made of a corrosion resistant material. The second conductor 7b can be made of any commonly use conducting material, such as copper or silver. The second conductor 7b is, for example a wire or a conducting bar.

The adhering layer 25 comprises conducting particles 22, distributed in an adhesive 20 so that a conducting network is formed in the adhesive 20 to achieve electrical contact between the second conductor 7b and the conducting material 24 in the porous substrate 5. Thus, electrical contact between the second conductor 7b and the upper porous conductive layer 4 is achieved. Suitably, the adhering layer 25 is made of the same type of adhesive 20 and the same type of conducting particles 22 as the adhering layer 8. The encapsulation 9 comprises a first penetration hole 12a for connecting the first conductor 7 to the lower porous conductive layer 6 and a second penetration hole 12b for connecting the second conductor 7b to the upper porous conductive layer 4.

In this example, the lower porous conductive layer 6 ends at a distance from the adhering layer 25 so that an insulating gap 27 is formed between the adhering layer 25 and the lower porous conductive layer 6 to ensure that the adhering layer 25 and the lower conductive layer 6 are electrically isolated from each other.

Figure 8:
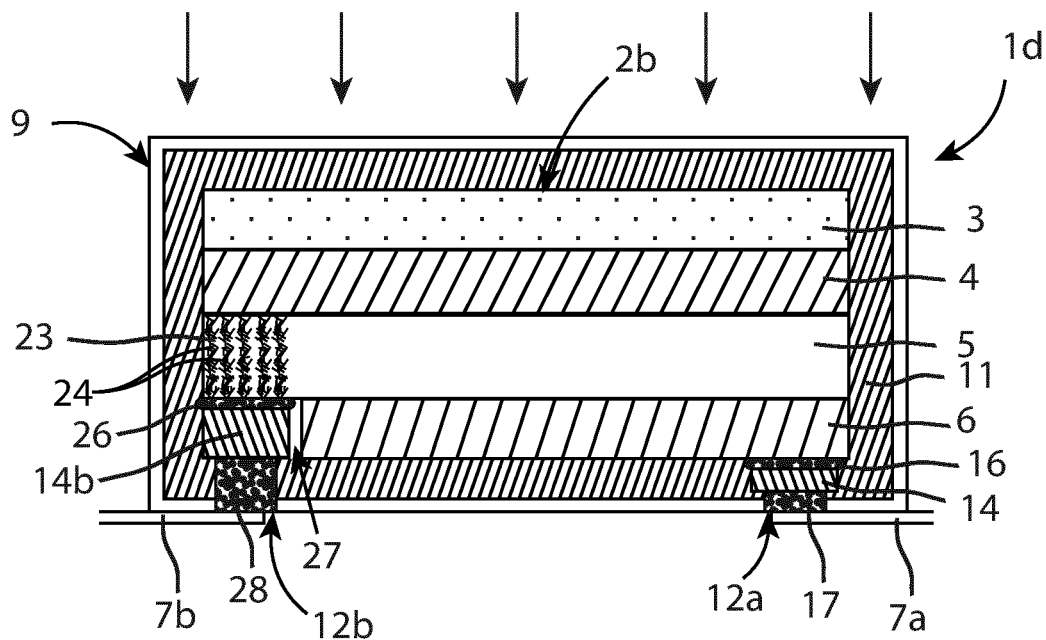
FIG. 8 shows a fourth example of a photovoltaic device according to the invention.

FIG. 8 shows a fourth example of a photovoltaic device 1d according to the invention. The solar cell unit 1d differs from the photovoltaic device 1c in that the solar cell unit 1d comprises a non-porous conducting barrier 14 disposed between the first conductor 7 and the lower porous conductive layer 6, in the same way as shown in FIG. 4. The solar cell unit 1d comprises a first adhering layer 16 disposed between the lower porous conductive layer 6 and the conducting barrier 14 for attaching the conducting barrier 14 to the lower porous conductive layer 6, and a second adhering layer 17 arranged between the conducting barrier 14 and a first conductor 7a for attaching the first conductor 7a to the conducting barrier 14.

The solar cell unit 1d further comprises a second non-porous conducting barrier 14b disposed between a second conductor 7b and the porous substrate 5, an third adhering layer 26 disposed between the conducting part 23 of the porous substrate 5 and the second conducting barrier 14b for attaching the conducting barrier 14b to the porous substrate 5, and a fourth adhering layer 28 arranged between the second conducting barrier 14b and the second conductor 7b for attaching the second conductor 7b to the conducting barrier 14b. The first and second conducting barriers 14 and 14b act together with as barriers for the ions in the conducting medium, and prevents the ions from penetrating to the outside of the photovoltaic device through the penetration holes 12a-b. Preferably, the conducting barriers 14 and 14b are made of the same material. Since the conducting barriers 14 and 14b are in contact with the conducting medium, they should preferably be made in a corrosion resistant material, for example, titanium.

The third and forth adhering layers 26, 28 comprise conducting particles distributed in an adhesive 20 so that a conducting network is formed in the adhesive to achieve electrical contact between the second conductor 7b and the conducting material 24 in the porous substrate 5. Suitably, the adhering layers 26, 28 are made of the same type of adhesive 20 and the same type of conducting particles 22 as the adhering layers 16, 17. The adhering layers 26, 28 can be of any of the types of adhering layers 8a-b previously described with reference to FIGS. 2-3.

The adhering layer 28 is arranged in the penetration hole 12b so that the penetration hole 12b is sealed and no gas or liquid can pass through the penetration hole. For example, the conducting barriers 14, 14b have a circular shape. However, other shapes are also possible, such as rectangular.

The present invention is not limited to the embodiments disclosed but may be varied and modified within the scope of the following claims. For example, each of the adhering layers 16, 17, 25, 26, and 28 can be of any of the types described with reference to FIGS. 2-3.

REFERENCE NUMBERS 1a-d Photovoltaic device
2a, 2b Solar cell unit
3 Light-absorbing layer
4 Upper porous conductive layer
5 Porous substrate
6 Lower porous conductive layer
7 Conductor
7b Second conductor
8, 8a-b Adhering layer
9 Encapsulation
10 Barrier layer of the encapsulation
11. Gluing layer of the encapsulation
12, 12a-b Penetration holes
14, 14a-b Non-porous conducting barrier
16 First adhering layer
17 Second adhering layer
20 Adhesive
22, 22a, 22b Conducting particles
23 Conducting part of the porous substrate
24 Conducting material
25 Adhering layer
26 Third adhering layer
27 Insulating gap
28 Forth adhering layer

The invention claimed is:

1. A photovoltaic device comprising:
a solar cell unit including:
   a working electrode comprising a light-absorbing layer,
   a counter electrode including a porous conductive layer, and
   a conducting medium for transferring charges between the counter electrode and the working electrode, and
an encapsulation enclosing the solar cell unit,
a conductor electrically connected to the porous conductive layer,
a non-porous conducting barrier disposed between the conductor and the porous conductive layer,
a first adhering layer disposed between the porous conductive layer and the conducting barrier for attaching the conducting barrier to the porous conductive layer, and
a second adhering layer arranged between the conducting barrier and the conductor for attaching the conductor to the conducting barrier, wherein the conductor extends on the outside of the encapsulation and the first adhering layer comprises an adhesive and conducting particles distributed in the adhesive so that a conducting network is formed in the adhesive, and the encapsulation surrounds the first and second adhering layers and the conducting barrier.

2. The photovoltaic device according to claim 1, wherein the encapsulation is provided with a penetration hole comprising at least a part of said second adhering layer and wherein the conductor is attached to the second adhering layer.

3. The photovoltaic device according to claim 1, wherein the encapsulation comprises a gluing layer for attaching the encapsulation to the solar cell unit, and the gluing layer is made of the same material as said adhesive.

4. The photovoltaic device according to claim 1, wherein the conducting barrier comprises titanium or an alloy thereof.

5. The photovoltaic device according to claim 1, wherein the thickness of said adhering layers is at least 3 μm.

6. The photovoltaic device according to claim 1, wherein the adhering layers comprise between 20 and 40 vol % of said conducting particles.

7. The photovoltaic device according to claim 1, wherein at least 80 wt-% of said conducting particles have a size of 5 µm or less.

8. The photovoltaic device according to claim 1, wherein the adhering layers comprise a mixture of conducting particles having a size less than 200 nm and conducting particles having a size larger than 1 µm.

9. The photovoltaic device according to claim 1, wherein said adhesive is polyethylene, or polypropylene, or ionomer or mixtures thereof.

10. The photovoltaic device according to claim 3, wherein said adhesive and said gluing layer comprise polyethylene.

11. The photovoltaic device according to claim 1, wherein said conducting particles comprise carbon.

12. The photovoltaic device according to claim 1, wherein said conducting particles comprise titanium of an alloy thereof.

13. The photovoltaic device according to claim 1, wherein the solar cell unit comprises:
- a porous substrate made of an insulating material,
- a upper conductive layer formed on one side of the porous substrate for extracting photo-generated electrons from the light-absorbing layer, and
- a second conductor in electrical contact with the upper conductive layer, a conducting part of the porous substrate comprises conducting material, and the photovoltaic device comprises at least one third adhering layer comprising said adhesive including said conducting particles and disposed between the second conductor and said conducting part of the porous substrate for attaching the second conductor to the porous substrate.

14. The photovoltaic device according to claim 1, wherein the thickness of said adhering layers is at least 5 µm.

15. The photovoltaic device according to claim 1, wherein the thickness of said adhering layers is at least 10 µm.

16. The photovoltaic device according to claim 1, wherein at least 80 wt-% of said conducting particles have a size of 3 µm or less.

17. The photovoltaic device according to claim 1, wherein the second adhering layer comprises an adhesive and conducting particles distributed in the adhesive so that a conducting network is formed in the adhesive of the second adhering layer.

* * * * *